United States Patent Office 2,988,173
Patented June 13, 1961

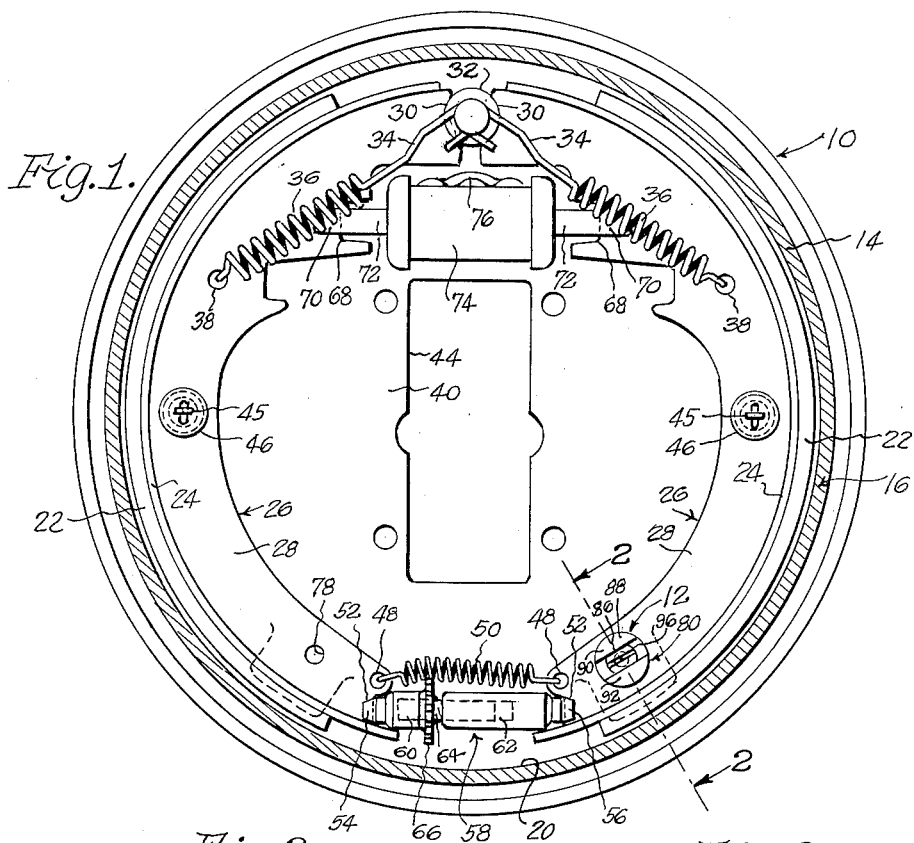
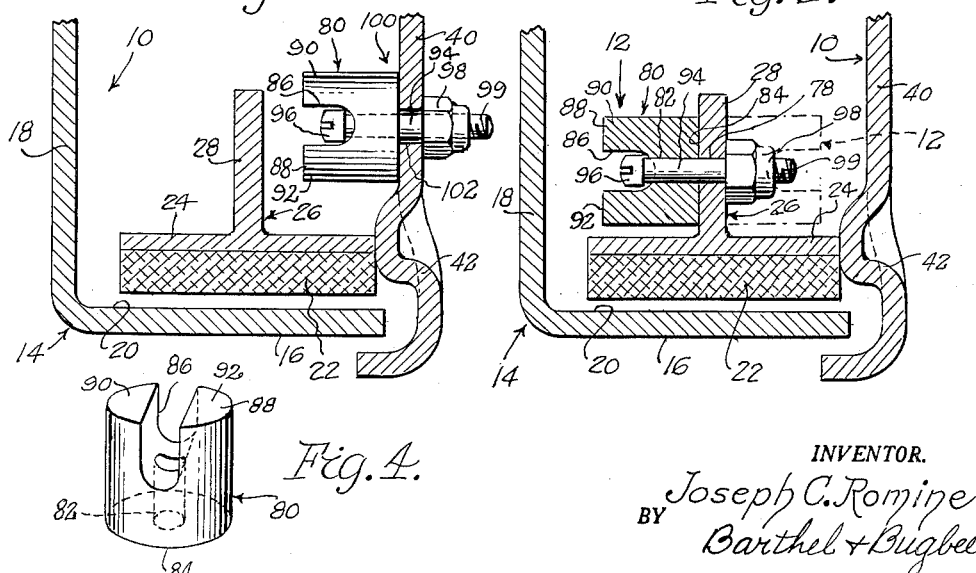

2,988,173
MAGNETIC FERROUS METAL DUST COLLECTOR
Joseph C. Romine, 20932 Norwood Ave.,
Harper Woods, Mich.
Filed Nov. 2, 1955, Ser. No. 544,403
4 Claims. (Cl. 188—1)

This invention relates to brakes and, in particular, to the protection of brakes from ferrous metal dust-contamination.

One object of this invention is to provide a magnetically-protected brake having a drum of ferrous metal equipped with magnetically-actuated means for collecting ferrous metal dust worn away from the drum during braking operations.

Another object is to provide a brake of the foregoing character wherein the magnetic dust collector consists of a magnet, preferably a permanent magnet, disposed in proximity to the brake drum and preferably in the lower portion thereof in proximity to the brake shoe, the abrasive action of which against the drum creates the ferrous metal dust.

Another object is to provide a brake of the foregoing character which has increased life and greatly improved stopping power as a result of the collection and elimination of the ferrous metal dust falling from the brake drum as a result of the frictional contact between it and the brake shoe.

Other objects and advantages of the invention will become apparent during the course of the following description of the accompanying drawings, wherein:

FIGURE 1 is a side elevation of a vehicle brake assembly in cross-section through the brake drum, wherein the brake shoe is equipped with a magnetic ferrous metal dust collector, according to one form of the invention;

FIGURE 2 is an enlarged transverse fragmentary section taken along the inclined line 2—2 in FIGURE 1;

FIGURE 3 is an enlarged fragmentary transverse section of a modified magnetically-protected brake wherein the magnetic ferrous metal dust collector is mounted on the stationary disc closing the open side of the brake drum; and FIGURE 4 is a perspective view of a permanent magnet which is adapted to be used in the magnetically-protected brakes of FIGURES 1 to 3 inclusive.

Hitherto, the vehicle brakes equipped with ferrous metal brake drums such as iron or steel drums have been subject to relative rapid deterioration in their braking qualities following the start of their period of use. Improvement in the brake lining material used upon the brake shoes of such brakes has aided their performance only to a disappointing degree, for despite the use of improved brake linings, it has been found that the braking qualities of brakes still deteriorate far more rapidly than experience would indicate should be the case.

My investigation into the causes of brake deterioration has shown me that one important factor in such deterioration lies in the contamination of the brake lining by the iron or steel dust which is worn away from the brake drum by the abrasive action caused by the engagement of the brake lining on the brake shoe with the brake drum. As the brake is increasingly used, the iron dust detached from the brake drum embeds itself in the brake lining on the brake shoe and renders it glazed and slippery, accelerating the braking defect commonly known as brake fading. Furthermore, this embedding of dust in the brake lining of the brake shoe accelerates the abrading effect thereof upon the brake drum by enhancing the grinding action by reason of the fact that an iron-dust-embedded brake lining has a greater abrasive action on a ferrous metal brake drum than a brake lining which is free from such embedded ferrous metal dust.

As a result of my investigations, I have found that by placing a magnet within the brake assembly, preferably on the brake shoe or adjacent thereto, I am able to collect the ferrous dust automatically before it has the chance to embed itself in the brake lining, because as rapidly as it is detached from the brake drum it comes into the zone of influence of the magnet so that it is attracted to the magnet and caused to adhere thereto. In experimenting with a brake so equipped with my magnetic ferrous dust collector, I have found, moreover, that the accumulation of ferrous dust is only a fraction of the amount which collects in a brake unit not so equipped, indicating that the magnetic ferrous dust collector is greatly instrumental in preventing the abrasive action between the brake lining of the brake shoe and the ferrous metal brake drum.

At the same time, however, my experiments with my magnetic ferrous dust collector show that my brake so equipped maintains a high degree of braking activity and consequently gives much better stopping power over a longer period of time, greatly reduces the glazing of the brake band or brake lining, and cuts down brake fading by a remarkable extent. My experiments thus prove that the ferrous dust is collected before it is able to embed itself in the brake lining or brake band and thus greatly reduces the further production of ferrous dust. Moreover, my experiments with a brake assembly which had long been in use before my magnetic ferrous dust collector was installed and without previously removing the ferrous dust, showed that my collector automatically attracted and removed all such ferrous dust therein.

Referring to the drawing in detail, FIGURE 1 shows a vehicle brake assembly, generally designated 10, equipped with my magnetic ferrous dust collector installation 12, with the brake assembly viewed in side elevation. The brake assembly 10 shown in FIGURE 1 is of a conventional type and the invention is not limited thereto, as it is capable of use with other types of brakes, so long as the dust emitted by the brake drum is ferrous dust. The brake assembly 10 includes the usual brake drum or rotary brake-engagement member 14 having the cylindrical portion 16 connected to the hub of the wheel (not shown) by the radial portion 18, the braking surface 20 being likewise cylindrical and ordinarily located on the inner side of the cylindrical portion 16. Engageable with the cylindrical braking surface 20 of the brake drum 14 is a brake band 22 or brake lining of arcuate form secured to the arcuate portion 24 of a brake shoe 26 of T-shaped cross-section having a radial rib 28 for mounting purposes. The arcuate portion 24 of the brake shoe 26 is substantially a portion of a cylinder corresponding approximately in shape to the arcuate section of a brake lining or brake band 22.

Each brake assembly 10 ordinarily includes a pair of such brake shoes 26 equipped with brake bands or linings 22, the latter being ordinarily of asbestos compound for heat-withstanding purposes and secured in any suitable way, such as by riveting or bonding, to the arcuate portion 24 of the brake shoe 26. The brake shoe ribs 28 at one end thereof are notched at 30 to engage a pivot pin or stud 32 which pivotally supports them. The stud 32 has an annularly-grooved reduced diameter portion 33 over which the U-shaped ends 34 of helical tension springs 36 are hooked, the opposite ends thereof being hooked into holes 38 in the brake shoe rib 28 remote from the pivot pin 32. The pivot pin 32 is itself mounted upon the stationary brake closure or cover disc 40 which closes the open side of the brake drum 16 and has a peripheral portion 42 of approximately S-shaped cross-section struck inwardly therefrom in order to properly position the brake shoe 26 within the brake drum 14. The brake disc 40 is provided with a rectangular aperture 44 for the passage of the front axle structure. The brake assembly 10 shown is a front wheel brake assembly, but the invention is equally applicable to rear wheel brakes or to aircraft brakes. The brake shoe ribs 28 are drilled for the passage of short wires or rods 45 secured to the brake disc 40 and carrying washers 46 and compression springs (not shown) between the washers 46 and the ribs 28, as conventionally used therein.

The opposite ends of the brake shoes 26 from their pivoted ends 30 are drilled as at 48 to receive the hooked opposite ends of a helical tension spring 50 and are also notched as at 52 to receive the correspondingly notched opposite ends 54 and 56 of a brake clearance adjuster, generally designated 58. The latter includes relatively rotatable portions 60 and 62, the portion 62 being internally-threaded and the portion 60 being provided with a threaded stem 64 threadedly engaging the internally threaded portion 62 and equipped with a circular toothed portion 66 for rotating the portion 60 relatively to its respective notched end portion 54 and also relatively to the internally-threaded portion 62. In this manner, the notched end portions 54 or 56 are caused to approach or recede relatively to one another, thereby causing the notched ends 52 of the brake shoes 26 to move toward or away from one another, consequently increasing or decreasing the clearance between the brake bands 22 and the braking surface 20 of the brake drum 16.

Intermediate their opposite ends 30 and 52, the brake shoes 26 are provided with intermediate notches 68 adapted to be engaged by the correspondingly-notched ends 70 of oppositely reciprocable brake piston rods 72 connected to piston heads (not shown) within the hydraulic brake cylinder 74. The latter is secured as at 76 to the upper portion of the brake disc 40 and connected by a suitable conduit (not shown) to the conventional hydraulic braking system of the vehicle. As a consequence, when pressure fluid is supplied to the brake cylinder 74, the piston rods 72 thereof move outward away from one another, swinging the brake shoes 26 outwardly around their common pivot pin 32 and engaging the brake linings or brake bands 22 with the braking surface 20 of the brake drum 16.

The rib portions 28 of the brake shoes near their free ends 52 are provided with holes 78, one of which is provided with the magnetic ferrous dust collector 12. The latter consists of a generally cylindrical body 80 (FIGURE 4) of permanently magnetizable material, such as an aluminum-nickel-cobalt alloy, having a central axial bore 82 extending inwardly from one end 84 thereof and a diametral transverse notch 86 extending inwardly from the other end 88 thereof and dividing the latter into two poles 90 and 92 of opposite magnetic polarity, one being a so-called "North" pole and the other a so-called "South" pole, to employ conventional terminology.

The magnet body 80 is held in position by a threaded fastener 94 passing through the bore 82 and one of the holes 78 (FIGURE 2) so that its laterally-flattened head 96 lies within the notch 86 and a retaining nut 98 is threaded upon the threaded opposite end 99, thereby holding the inner end 84 of the magnet body 80 firmly against the brake shoe rib 28.

The modified magnetic ferrous dust collector installation, generally designated 100, shown in FIGURE 3 has a brake assembly 10 similar to that of FIGURES 1 and 2 but with the magnet body 80 mounted on the stationary brake disc 40 rather than on the rib 28 of the brake shoe 26, as in FIGURES 1 and 2. For this purpose, the brake disc 40 is provided with a hole 102 preferably near the bottom thereof and of a size adapted to receive the fastentr 94, the flattened head 96 of which is located as before within the notch 86 of the magnet body 80 and the nut 98 engages the opposite side of the brake disc 40 from the magnet body 80. The location of the magnet body 80 is preferably near the bottom of the brake assembly 10 in order to catch the ferrous metal dust near its lowest point of fall as well as to intercept such dust carried around.

In the operation of the invention, let it be assumed that the vehicle is in motion, that the brake drum 14 attached to the vehicle wheel is rotating, and that the operator has depressed the brake pedal to cause hydraulic pressure fluid to enter the hydraulic brake cylinder 74 and cause its piston rods 72 to move the brake shoes 26 apart and bring the brake bands or brake linings 22 into frictional contact with the internal braking surface 21 of the cylindrical portion 16 of the brake drum 14. When this occurs, such frictional contact detaches ferrous metal powder from the surface 20 of the brake drum 14, assuming the latter to be formed, as is usual, of ferrous metal such as iron or steel. The ferrous metal powder thus detached from the brake drum surface 20 either drops by gravity to the bottom thereof or is carried around thereto by centrifugal force combined with rotation, so that it comes within the zone of influence of the magnet 80, and is caused to adhere thereto by magnetic attraction. Subsequently detached ferrous metal particles likewise come within the zone of magnetic influence of the magnet 80 and, as a consequence, also attach themselves to it, with the result that in the course of time and after a considerable use of the brake, the magnet 80 becomes encrusted with ferrous metal dust, little or none of which is enabled to enter the space between the brake lining 22 and the braking surface 20 of the brake drum 14 so as to embed itself in the brake bend or lining 22. The result is that the brake bands or linings 22 retain their efficient gripping action over a much longer period of time and for a much greater distance of use than is the case with brake bands or linings in brakes not equipped with my magnetic ferrous metal dust collector.

Moreover, a second magnetic effect in the course of time further enhances the magnetic ferrous dust collecting action of the installation 12 or 100, in that the brake shoes 26 and the brake disc 40 are ordinarily constructed of steel or other ferrous metal and consequently become temporarily magnetized in an area in the vicinity of the magnet 80. The ferrous metal dust thus is caused to adhere, not only to the magnet 80 itself, but also to the magnetized portions of the brake disc 40 or brake shoe 26 in the vicinity of the maget net 80.

FIGURE 2 in dotted lines also shows how the position of the magnetic ferrous dust collector 12 may be reversed, so that it faces the stationary brake disc 40, rather than the rotary brake drum 14. This dotted-line position of FIGURE 2 is indeed preferred to the solid-line position therein because it localizes the collection of ferrous metal dust upon it and the adjacent portion of the stationary brake disc 40, and also avoids the formation of eddy currents generated by the presence of the magnetic body 80 adjacent the rotating brake drum 18.

In addition to the greatly increased braking efficiency as regards smoothness and speed of stopping, the present invention achieves the important advantage of greatly reducing the pressure required to be exerted on the brake pedal and consequently on the brake bands or linings than has hitherto been the case, particularly after the brake has been in use for a considerable period of mileage. The absence of brake lining impregnation and consequent glazing by ferrous dust brought about by the present invention eliminates the increasingly heavy brake pedal pressure previously required for that reason, and in its place substitutes so light a brake pedal pressure that many drivers who for the first time operate a brake system equipped with the ferrous dust eliminator of the present invention think that it is power-operated, whereas in fact it is not.

This greatly reduced foot pedal pressure required on the brake pedal of a brake system equipped according to the present invention also greatly increases safety of operation and strikingly reduces the rate of brake lining wear and prolongs the life of the brake lining. Moreover, by maintaining the coefficient of friction between the brake lining and the brake drum at a high level because of lack of iron particle impregnation and consequent glazing, the present invention further greatly enhances ease of operation, safety in driving, increased life of brake linings, greatly reduced cost of repairs and maintenance, and much less frequently required adjustments.

What I claim is:

1. A ferrous-dust-free vehicle brake construction comprising a rotary ferrous metal brake engagement structure, stationary brake closure member disposed adjacent said brake engagement structure and enclosing a brake chamber, a brake shoe member disposed in said chamber and movable into and out of braking engagement with said rotary brake engagement structure, and a permanently magnetic ferrous metal dust collecting magnet mounted on one of said members within said chamber in close proximity to said rotary brake engagement structure but in spaced relationship therewith.

2. A ferrous-dust-free vehicle brake construction comprising a rotary ferrous metal brake engagement structure, a stationary brake closure member disposed adjacent said brake engagement structure and enclosing a brake chamber, a brake shoe member disposed in said chamber and movable into and out of braking engagement with said rotary brake engagement structure, and a permanently magnetic ferrous metal dust collecting magnet mounted on one of said members in the lower portion of said chamber in close proximity to said rotary brake engagement structure but in spaced relationship therewith.

3. A ferrous-dust-free vehicle brake construction comprising a rotary ferrous metal brake engagement structure, a stationary brake closure member disposed adjacent said brake engagement structure and enclosing a brake chamber, a brake shoe member disposed in said chamber and movable into and out of braking engagement with said rotary brake engagement structure, and a permanently magnetic ferrous dust collecting magnet mounted on said brake drum closure member within said chamber in close proximity to said rotary brake engagement structure but in spaced relationship therewith.

4. A ferrous-dust-free vehicle brake construction comprising a rotary ferrous metal brake engagement structure, a stationary brake closure member disposed adjacent said brake engagement structure and enclosing a brake chamber, a brake shoe member disposed in said chamber and movable into and out of braking engagement with said rotary brake engagement structure, and a permanently magnetic ferrous metal dust collecting magnet mounted on said brake shoe member within said chamber in close proximity to said rotary brake engagement structure but in spaced relationship therewith.

References Cited in the file of this patent

UNITED STATES PATENTS

| | | |
|---|---|---|
| 233,891 | Stoddard | Nov. 2, 1880 |
| 1,919,343 | Payne | July 25, 1933 |
| 2,056,906 | Parkhill | Oct. 6, 1936 |
| 2,214,268 | Brooks | Sept. 10, 1940 |
| 2,677,461 | Bodey | May 4, 1954 |